Patented May 10, 1927.

1,628,516

UNITED STATES PATENT OFFICE.

JOSEPH B. SCOTT, OF FREEPORT, ILLINOIS.

RIM-TREATMENT PROCESS.

No Drawing.　　Application filed November 28, 1924. Serial No. 752,800.

Heretofore the problem of removing tires from the wheels of motor vehicles has been troublesome and caused considerable difficulty in that after a tire has been on the rim for a long period of time it invariably sticks to the rim to a greater or lesser degree under different conditions and circumstances, due mainly to corrosion of the metal rim and deterioration of the rubber and fabric materials in the tire. These tendencies for the tire to stick to the rim cause considerable trouble to the motorist especially when it is necessary to change a tire while on the road without the aid of the most effective tools. In fact, it is not infrequent that a tire has become so "frozen" to the rim that it is necessary to injure the tire in order to remove it.

The primary purpose of the present invention is to provide a new process of treating motor vehicle wheel rims consisting in applying a novel composition or compound for the purpose of preventing the tire from sticking to the rim and to facilitate removal of the tire.

To this end I have provided a composition which may be used in any practicable form, that is, as a solid in bar form to be carried in the car or for quick and handy use in a garage by rubbing it onto the rim before mounting a tire, or in plastic or fluid form so that it may be applied by a brush or any convenient means. Application of the compound is in any event facilitated by heating the rim just sufficiently to melt or soften the composition.

The composition is preferably composed of beeswax and graphite, or the equivalent, in substantially equal parts by weight, these being thoroughly mixed by the aid of heat and by stirring. This composition when applied to the metal rim prevents corrosion thereof. It is effective when applied either to new or old (corroded) rims. In the latter instance after all loose rust has been brushed off the composition penetrates and provides a coating over the adhering rust so as to prevent further corrosion and likewise provide a substantially permanent lubricant between the rim and tire which facilitates easy separation of these parts.

My invention also contemplates the use of a filler to give greater body to the composition; and to this end I prefer to use a granular or powdered soapstone or mica, or both. The proportions of these ingredients might vary considerably according to the particular form in which the composition is to be used or to the conditions or requirements of use. One example, by weight, is beeswax one part, graphite one and one-half parts, and soapstone one-half part. Another is, beeswax one part, soapstone two parts, and mica in powdered form one-half part.

One of the important advantages of my invention is that the composition will not deteriorate the rubber or fabric material in the tire. In this regard it should be noted that beeswax is one of the principal constituents of the composition, and that no petrolatum products or others are used which are injurious to rubber. Another advantage of my composition is that it will not be affected by weather conditions.

I claim as my invention:

1. The process of treating motor vehicle wheel rims to prevent sticking of the tire to the metal rim which consists in applying a rim compound comprising beeswax and graphite.

2. The process of treating motor vehicle wheel rims to prevent sticking of the tire to the metal rim which consists in applying a rim compound composed of beeswax, graphite and a filler having substantially the properties of soapstone or mica.

3. The process of treating motor vehicle wheel rims to prevent sticking of the tire to the metal rim which consists in applying a rim compound comprising beeswax and graphite in substantially equal parts by weight which have been thoroughly mixed by stirring while heating.

4. The process of treating motor vehicle wheel rims to prevent sticking of the tire to the metal rim which consists in applying a rim compound composed of one part beeswax, one and one-half parts graphite, and one-half part soapstone (filler), each part by weight.

JOSEPH B. SCOTT.